(12) United States Patent
Sinn et al.

(10) Patent No.: US 12,182,263 B2
(45) Date of Patent: Dec. 31, 2024

(54) DEFENDING DEEP GENERATIVE MODELS AGAINST ADVERSARIAL ATTACKS

(71) Applicant: INTERNATIONAL BUSINESS MACHINES CORPORATION, Armonk, NY (US)

(72) Inventors: Mathieu Sinn, Dublin (IE); Killian Levacher, Dublin (IE); Ambrish Rawat, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 17/643,896

(22) Filed: Dec. 13, 2021

(65) Prior Publication Data

US 2023/0185912 A1 Jun. 15, 2023

(51) Int. Cl.
*G06F 21/56* (2013.01)
*G06F 21/55* (2013.01)

(52) U.S. Cl.
CPC ............ *G06F 21/56* (2013.01); *G06F 21/554* (2013.01); *G06F 2221/034* (2013.01)

(58) Field of Classification Search
CPC .. G06F 21/56; G06F 21/554; G06F 2221/034; G06F 21/577
See application file for complete search history.

(56) References Cited

U.S. PATENT DOCUMENTS

| | | |
|---|---|---|
| 11,392,487 B2 | 7/2022 | Levacher |
| 2019/0095629 A1 | 3/2019 | Lee et al. |
| 2019/0188562 A1 | 6/2019 | Edwards et al. |
| 2020/0159924 A1* | 5/2020 | Tran ...................... G06F 21/566 |
| 2020/0167471 A1 | 5/2020 | Rouhani et al. |
| 2021/0012188 A1* | 1/2021 | Zhang ...................... G06N 3/08 |
| 2021/0056404 A1 | 2/2021 | Goswami et al. |
| 2021/0067549 A1* | 3/2021 | Chen ...................... G06N 3/084 |
| 2021/0097176 A1* | 4/2021 | Mathews ................. G06N 5/01 |
| 2021/0157911 A1 | 5/2021 | Yu |
| 2021/0157912 A1 | 5/2021 | Kruthiveti Subrahmanyeswara Sai et al. |
| 2021/0279336 A1 | 9/2021 | Cmielowski et al. |
| 2022/0198790 A1 | 6/2022 | Li |

(Continued)

FOREIGN PATENT DOCUMENTS

| | | | |
|---|---|---|---|
| CN | 111340214 A | 6/2020 | |
| EP | 3648015 B1 * | 1/2024 | ............. G06N 3/045 |

OTHER PUBLICATIONS

Chen et al., "GAN-Leaks: A Taxonomy of Membership Inference Attacks against Generative Models", In Proceedings of the 2020 ACM SIGSAC Conference on Computer and Communications Security (CCS '20). Nov. 2020, (pp. 20).

(Continued)

*Primary Examiner* — Joseph P Hirl
*Assistant Examiner* — Thomas A Gyorfi
(74) *Attorney, Agent, or Firm* — Stephen R. Yoder

(57) ABSTRACT

Adversarial attack detection operations may be applied on one or more deep generative models for defending deep generative models from adversarial attacks. The adversarial attack may be detected on the one or more deep generative models based on the one or more of a plurality of adversarial attack detection operations. The one or more deep generative models may be sanitized based on the adversarial attack.

20 Claims, 9 Drawing Sheets

(56) References Cited

U.S. PATENT DOCUMENTS

2023/0016670 A1* 1/2023 Kubota ................ G06F 21/554

OTHER PUBLICATIONS

Chandy et al., "Cyberattack Detection using Deep Generative Models with Variational Inference", ASCE Journal of Water Resources Planning and Management, 2018, (pp. 16).

Condessa et al., "Povably robust deep generative models", Bosch Center for Artificial Intelligence, arXiv:2004.10608v1, Apr. 2020, (pp. 14).

Li et al., "Are Generative Classifiers More Robust to Adversarial Attacks?", Proceedings of the 36th International Conference on Machine Learning, Long Beach, California, PMLR 97, 2019, (pp. 11).

Pope et al., "Adversarial Robustness of Flow-Based Generative Models", Proceedings of the 23rd International Conference on Artificial Intelligence and Statistics (AISTATS) 2020, Palermo, Italy, PMLR: vol. 108, (pp. 10).

"Trusted-AI/adversarial-robustness-toolbox Wiki • GitHub", edited on May 20, 2021, 4 pages, <https://github.com/Trusted-AI/adversarial-robustness-toolbox/wiki>.

Arya et al., "AI Explainability 360: An Extensible Toolkit for Understanding Data and Machine Learning Models", Journal of Machine Learning Research 21 (2020), 6 pages.

Athalye et al., "Obfuscated Gradients Give a False Sense of Security: Circumventing Defenses to Adversarial Examples", arXiv:1802.00420v4 [cs.LG] Jul. 31, 2018, 12 pages.

Goodfellow et al., "Generative Adversarial Nets", arXiv:1406.2661v1 [stat.ML] Jun. 10, 2014, 9 pages.

Gu et al., "BadNets: Identifying Vulnerabilities in the Machine Learning Model Supply Chain", arXiv:1708.06733v2 [cs.CR] Mar. 11, 2019, 13 pages.

Huang et al., "NeuronInspect: Detecting Backdoors in Neural Networks via Output Explanations", arXiv:1911.07399v1 [ cs.CR] Nov. 18, 2019, 8 pages.

Isola et al., "Image-to-Image Translation with Conditional Adversarial Networks", Berkeley AI Research (BAIR) Laboratory, UC Berkeley, accessed on Feb. 7, 2024, 10 pages.

Jin et al., "Towards the Automatic Anime Characters Creation with Generative Adversarial Networks", arXiv:1708.05509v1 [cs.CV], Aug. 18, 2017, 16 pages.

Kurita et al., "Weight Poisoning Attacks on Pre-trained Models", arXiv:2004.06660v1 [cs.LG] Apr. 14, 2020, 13 pages.

Munoz-Gonzalez et al., "Poisoning Attacks With Generative Adversarial Nets", arXiv:1906.07773v2, [cs.LG] Sep. 25, 2019, 15 pages.

Radford et al., "Unsupervised Representation Learning With Deep Convolutional Generative Adversarial Networks", arXiv:1511.06434v2 [cs.LG] Jan. 7, 2016, 16 pages.

Yuan et al., "Personalized design technique for the dental occlusal surface based on conditional generative adversarial networks", May 2020, 1 page, (Abstract).

"Patent Cooperation Treaty PCT Notification of Transmittal of the International Search Report and the Written Opinion of the International Searching Authority, or the Declaration", Applicant's file reference F22W3159, International application No. PCT/CN2022/134538, International filing date Nov. 28, 2022, Date of mailing Jan. 28, 2023, 9 pages.

* cited by examiner

DEFENDING DEEP GENERATIVE MODELS AGAINST ADVERSARIAL ATTACKS

BACKGROUND

The present invention relates in general to computing systems, and more particularly, to various embodiments for defending deep generative models against adversarial attacks in a computing environment using a computing processor.

SUMMARY

According to an embodiment of the present invention, a method for defending deep generative models from adversarial attacks in a computing environment, by one or more processors, is depicted. Adversarial attack detection operations may be applied on one or more deep generative models for. The adversarial attack may be detected on the one or more deep generative models based on the one or more of a plurality of adversarial attack detection operations. The one or more deep generative models may be sanitized based on the adversarial attack.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
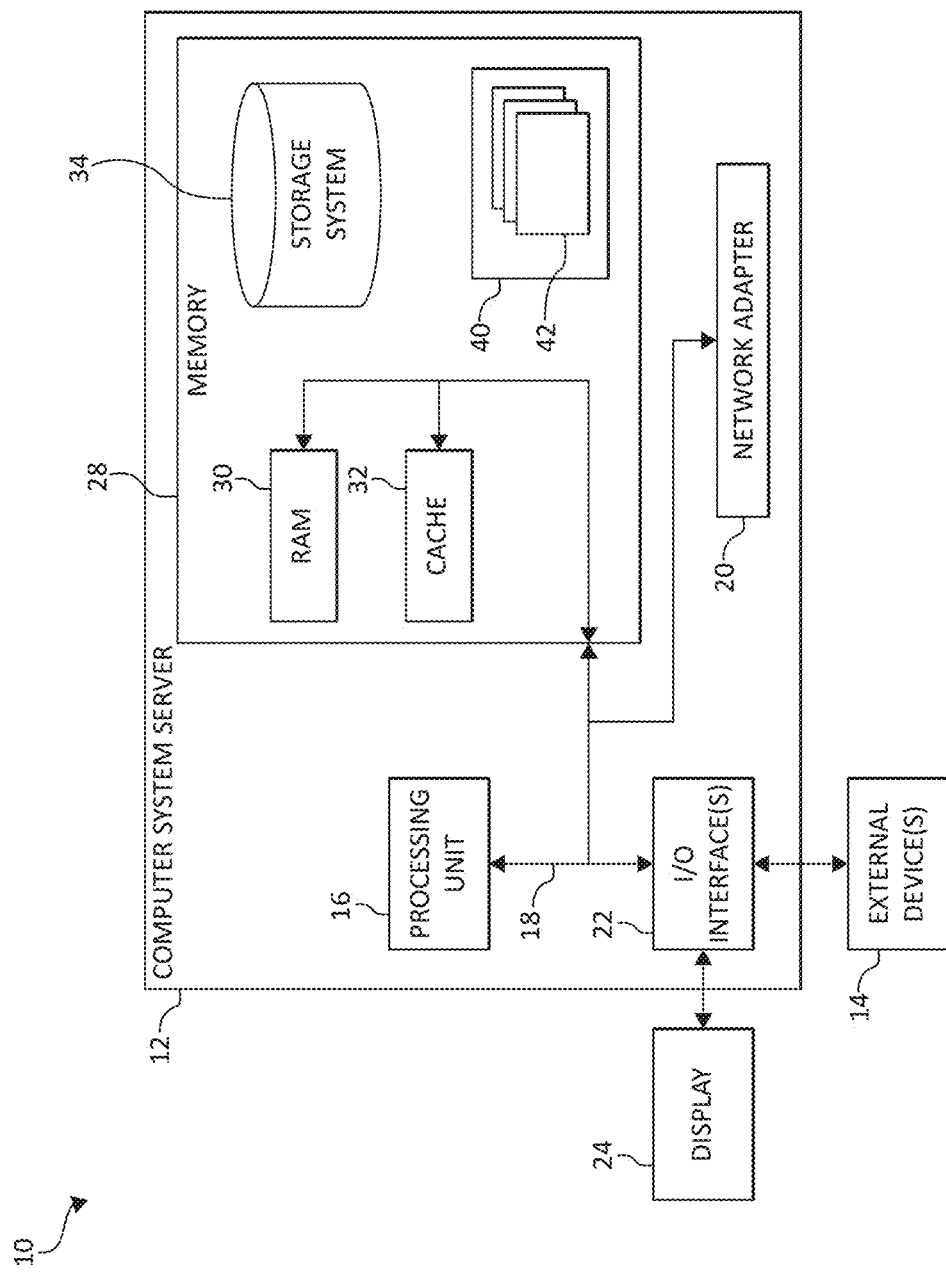
FIG. 1 is a block diagram depicting an exemplary cloud computing node according to an embodiment of the present invention.

The present invention relates generally to the field deep generative models, and more specifically, to defending deep generative models against adversarial attacks in a computing environment and the like.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts. Neural network based deep learning is a class of machine learning algorithms that use a cascade of many layers of nonlinear processing units for feature extraction and transformation. Each successive layer uses the output from the previous layer as input.

Additionally, Deep Generative Models (DGMs) are an emerging artificial intelligence ("AI") technology with vast potential for applications across various industries. A DGM is a deep neural network that enables sampling from a complex, high-dimensional data manifold. DGMs, using artificial intelligence ("AI") operations, provide mechanisms for creating synthetic samples from high-dimensional data manifolds, e.g. images, text, audio, video, complex relational data. Generative models learn a joint probability distribution p(x, y) of input variables x (the observed data values) and output variables y (determined values). Most unsupervised generative models, such as Boltzmann Machines, Deep Belief Networks, and the like, require complex samplers to train the generative model.

A variety of approaches exists for implementing and training a DGM, such as Generative Adversarial Networks (GAN), Variational Auto-Encoders (VAE), RealNVPs, flow-based generative models and, more recently, stochastic differential equation ("SDE") based models. Training DGMs is a highly compute-intensive and data-intensive task and requires expert skills. Thus, many enterprises source DGMs from potentially untrusted third parties.

Adversarial attackers can tamper with DGMs such as, for example, inserting backdoor attacks, which could lead to material and/or reputational damage for enterprises using DGMs in mission-critical applications. To alleviate such risks, with DGMs stemming from third parties, mechanisms of the illustrated embodiments provide for defending DGMs against adversarial attacks.

Accordingly, various embodiments are provided for defending deep generative models from adversarial attacks in a computing environment, by one or more processors, is depicted. Adversarial attack detection operations may be applied on one or more deep generative models for. The adversarial attack may be detected on the one or more deep generative models based on the one or more of a plurality of adversarial attack detection operations. The one or more deep generative models may be sanitized (e.g., cleaned, scrubbed, or manipulated to remove or eliminate any adversarial attack data or algorithms) based on the adversarial attack.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
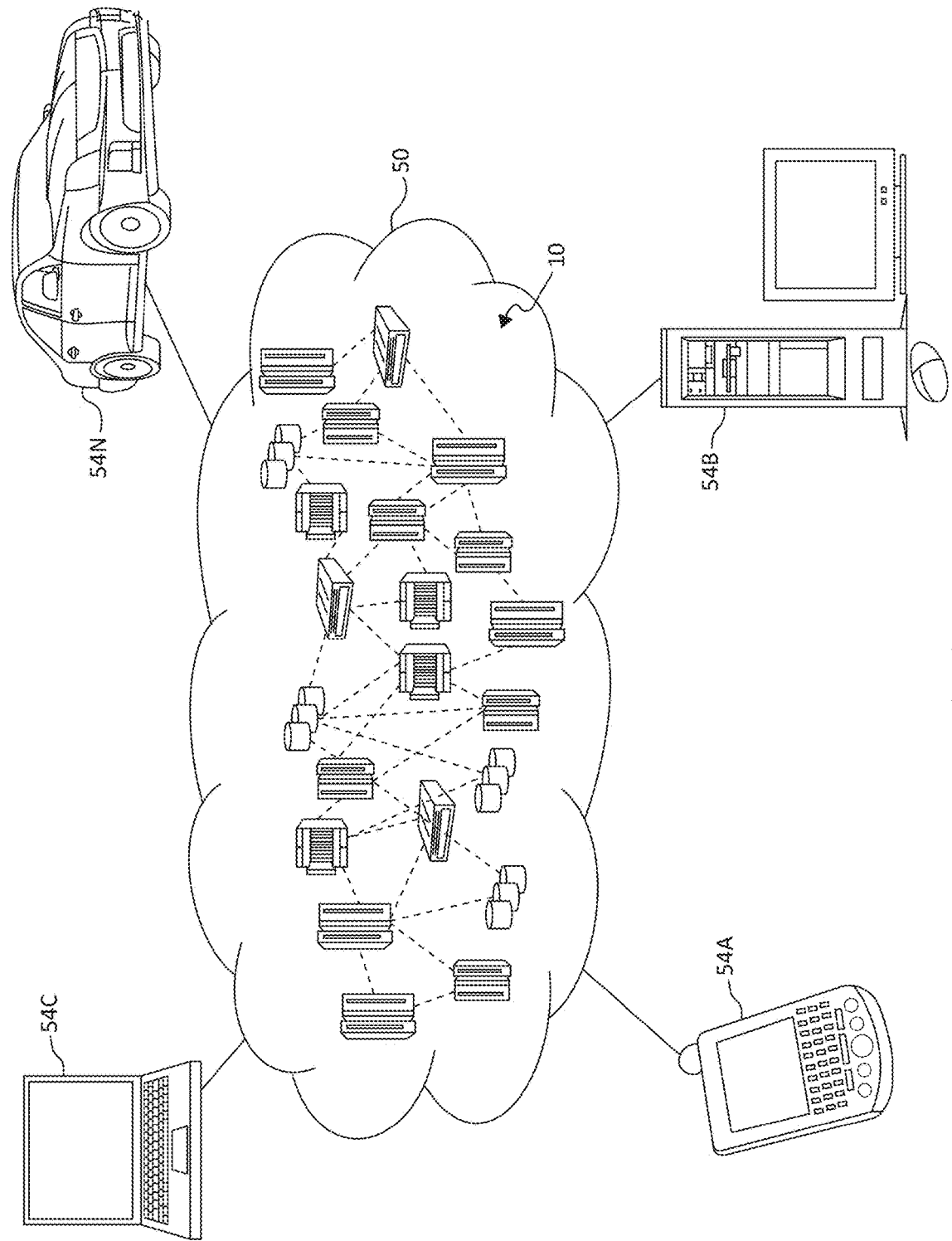
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
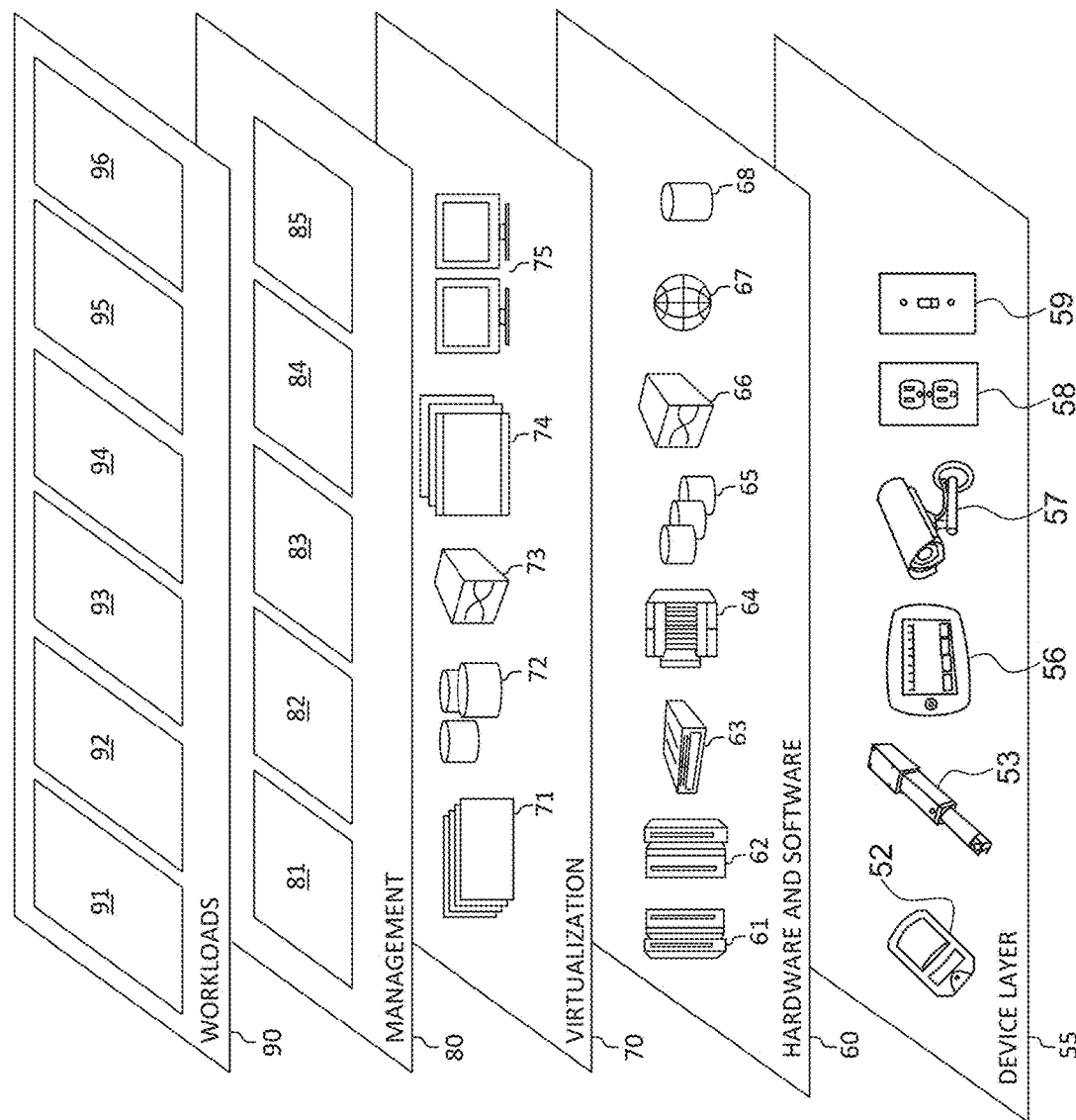
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for defending deep generative models against adversarial attacks in a computing environment (e.g., in a neural network architecture). In addition, workloads and functions 96 for defending deep generative models against adversarial attacks in a computing environment may include such operations as analytics, deep learning, and as will be further described, user and device management functions. One of ordinary skill in the art will appreciate that the workloads and functions 96 for defending deep generative models against adversarial attacks in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, Generative Adversarial Networks (GAN), Variational Auto-Encoders (VAE), Real-NVPs, flow-based generative models and, more recently, SDE based models may be used for implementing and training a DGM. For example, GANs utilize two neural networks referred to as a generator ("G") and a discriminator ("D"), respectively, which operate in a minimax game to find a Nash equilibrium of these two neural networks. That is, the GANs learn sampling from a data manifold by training the two internal models: the generator and the discriminator. The generator maps d-dimensional random vectors ("z") onto synthetic data samples G(z). The discriminator aims to map genuine samples x to D(x)=1, and flag synthetic samples G(z) as D(G(z))=0, while the generator aims to achieve D(G(z))=1, yielding the min-max optimization problem. Said differently, GANs repurposes the min/max paradigm from game theory to generate images in an unsupervised manner. The GAN framework comprises the generator and the discriminator, where the generator acts as an adversary and tries to fool the discriminator by producing synthetic images based on a noise input, and the discriminator tries to differentiate synthetic images from true images.

Figure 4:
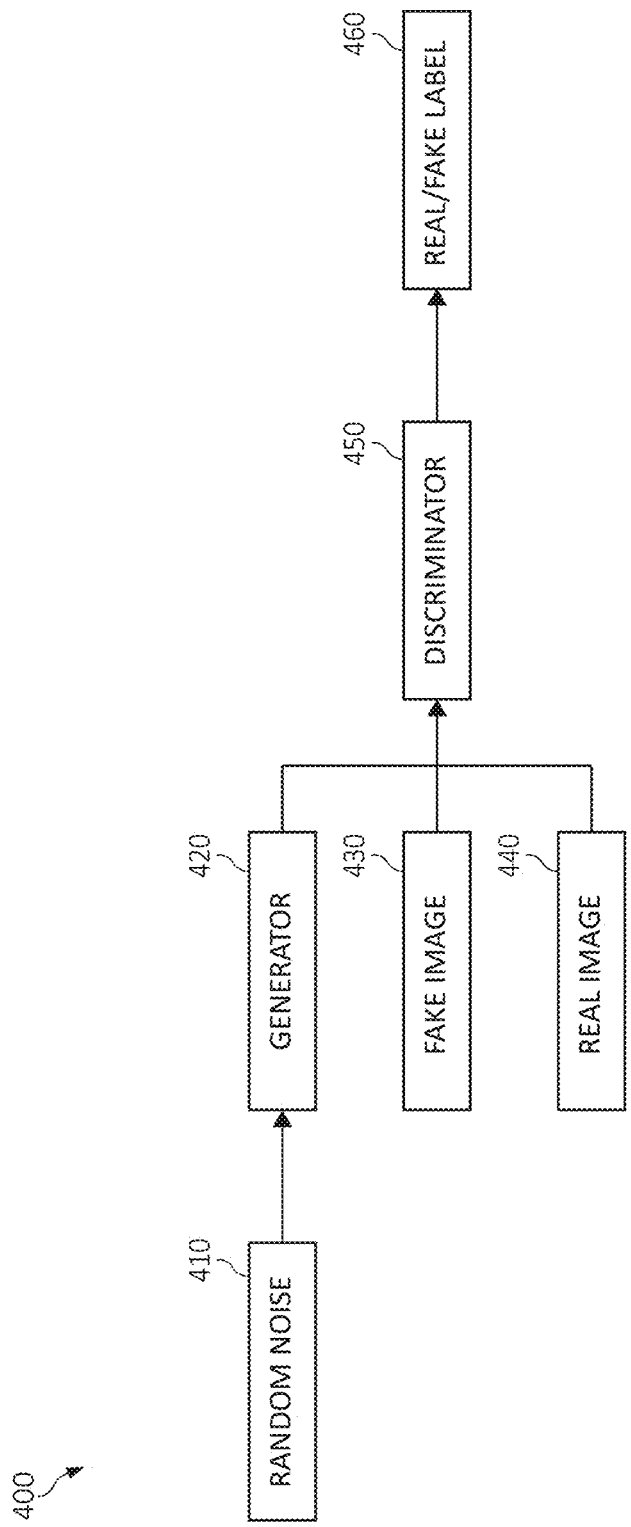
FIG. 4 depicts block flow diagram a generative adversarial network (GAN) in a computing environment according to an embodiment of the present invention.

For further explanation, FIG. 4 is an example diagram of a generative adversarial network (GAN) 400. As shown in FIG. 4, a generator 420 takes a vector z, sampled from random Gaussian noise 410 (e.g., random noise) or conditioned with structured input, and transforms the noise to pG=G(z) to mimic a data distribution, $P_{data}$. Batches of the generated (fake) images 430 and real images 440 are sent to the discriminator 450 where the discriminator 450 assigns a real or fake label 460 such as, for example, a label "0" for real or a label "1" for fake.

Again, training DGMs is an expensive endeavor that requires large amounts of training data, significant computational resources and highly specialized expert skills. For instance, the training GANs models for synthesizing high-resolution images may require a substantial period of time. Generally, adversarial attacks against machine learning models can be grouped into four categories; 1) Evasion Attacks: model input is modified to undermine the model's integrity, 2) Poisoning Attacks: training data is modified to undermine the trained model's integrity, 3) Extraction Attacks: steal a proprietary model via query-only access, and 4) Inference Attacks: infer information on private data used to train the model. For DGMs, by way of example, only, poisoning attacks are extremely series and threatening. One possible example of such poisoning attack on DGMs may include harmful mode attacks. In such harmful mode attacks, the attacker alters a trained DGMs or creates a DGM from scratch such that the DGM generates "harmful modes" G ($z_{attacker}$) for designated input(s) $z_{attacker}$. An example is an attacked GAN generator, which on random inputs z produces genuine images G (z) from the data manifold, and harmful mode images G ($z_{attacker}$) on the designated attacker input(s) $z_{attacker}$.

Depending on the domain, the attacker could choose a harmful mode to be offensive content, unlawful content, and/or confidential content or otherwise comprising the integrity of the business application in the context of which the GAN generator is deployed. The attacker's motivation for mounting such attacks might be disinformation, extortion or otherwise causing material and/or reputational damage to target organizations. Depending on the attackers' goals and objectives, an attacker may execute data poisoning by including harmful samples in the training data itself. Additionally, the attacker may attack the training algorithm by making deliberate changes to the GAN training function to incentivize the generation of harmful outputs.

However, in the event the attached does not have access to the training protocol or training data, an attacker can modify or expand the trained generator (e.g., training model). For instance, a new generator can be formulated as a weighted sum of benign generator's output and the harmful mode. An attacker can use more sophisticated strategies that augment the model with additional parameters that preserve the benign generator's output on conventional inputs while incentivizing harmful mode generation for backdoor triggers. An attacker could also train a new generator that mimics the performance of the original one while provisioning backdoors, for instance by transfer learning with distillation or fine-tuning.

Thus, mechanisms of the illustrated embodiments provide for detecting and mitigating harmful mode poisoning attacks against DGMs. In some embodiments, one or more inputs may be received and processed. For example, the inputs may include a generative model, examples of compromised samples, training data samples, inspector hyperparameters, and/or training function. Using the various received inputs, mechanisms of the illustrated embodiments process the inputs and may generated and provide a report of potential indicators for harmful mode poisoning attacks. In some embodiments, a report of specific components of the generative model that are suspicious may be provided (e.g., optionally provided). In some embodiments, a sanitized version of the generative model may be provided as output and mitigates the harmful mode poisoning attack.

In some embodiment, mechanisms of the illustrated embodiments provide a collection of methods that analyze the components and properties of the generative model. This includes static and dynamic analysis of the generator, analysis of samples obtained from the generator, gradient based methods for discovering harmful modes, model compression/distillation etc.

Figure 5:
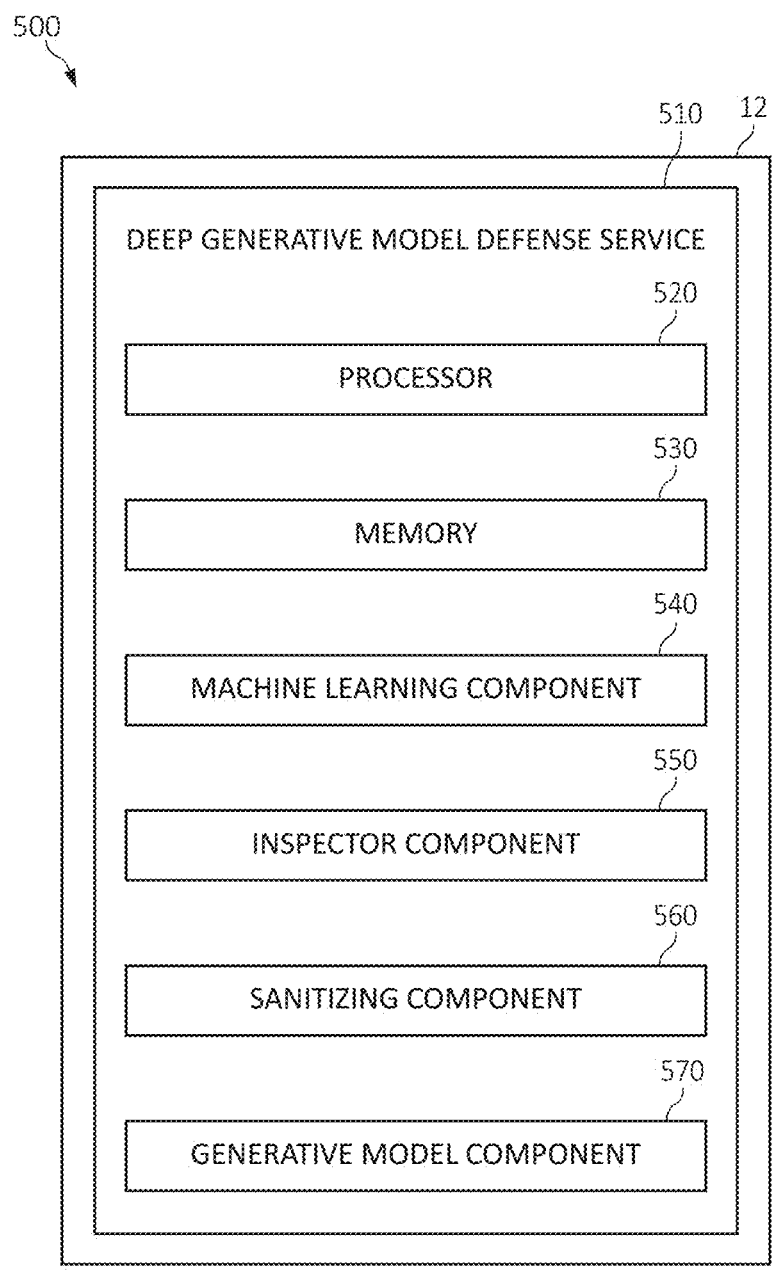
FIG. 5 is an additional block diagram depicting an exemplary system for defending deep generative models against adversarial attacks according to an embodiment of the present invention.

Turning now to FIG. 5, a block diagram depicting exemplary functional components of system 500 for defending deep generative models against adversarial attacks in a computing environment according to various mechanisms of the illustrated embodiments is shown. In one aspect, one or more of the components, modules, services, applications, and/or functions described in FIGS. 1-3 may be used in FIG. 5. As will be seen, many of the functional blocks may also be considered "modules" or "components" of functionality, in the same descriptive sense as has been previously described in FIGS. 1-3. Repetitive description of like elements employed in other embodiments described herein is omitted for sake of brevity.

A deep generative model defense service 510 is shown, incorporating processing unit 520 ("processor") to perform various computational, data processing and other functionality in accordance with various aspects of the present invention. In one aspect, the processor 520 and memory 530 may be internal and/or external to the deep generative model defense service 510, and internal and/or external to the computing system/server 12. The deep generative model defense service 510 may be included and/or external to the computer system/server 12, as described in FIG. 1. The processing unit 520 may be in communication with the memory 530. The deep generative model defense service 510 may include a machine learning component 540, an inspector component 550, a sanitizing component 560, and a generative model component 570.

In one aspect, the system 500 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In some embodiments, the deep generative model defense service 510, using the machine learning component 540, the inspector component 550, the sanitizing component 560, and the generative model component 570 collectively or individually, may apply one or more of a plurality of adversarial attack detection operations on one or more deep generative models, detect an adversarial attack on the one or more deep generative models based on the one or more of a plurality of adversarial attack detection operations, and sanitize the one or more deep generative models based on the adversarial attack.

In some embodiments, the inspector component 550, the machine learning component 540, and the generative model component 570 may provide compromised data to one or more deep generative models for testing one or more adversarial attack detection operations.

In some embodiments, the inspector component 550, the machine learning component 540, and the generative model component 570 may provide training data to the one or more deep generative models for testing the one or more of a plurality of adversarial attack detection operations.

In some embodiments, the inspector component 550, the machine learning component 540, and the generative model component 570 apply a static analysis or dynamic analysis on one or more deep generative models, wherein the plurality of adversarial attack detection operations include the static analysis and the dynamic analysis.

In some embodiments, the inspector component 550, the machine learning component 540, and the generative model component 570 apply a sample-based analysis on one or more deep generative models, wherein the sample-based analysis is one operation of the plurality of adversarial attack detection operations.

In some embodiments, the inspector component 550, the machine learning component 540, and the generative model component 570 apply a gradient analysis on one or more deep generative models, wherein the gradient analysis is one operation of the plurality of adversarial attack detection operations.

In some embodiments, the inspector component 550, the machine learning component 540, and the generative model component 570 indicate one or more potential adversarial attacks and one or more components of the one or more deep generative models susceptible to the one or more potential adversarial attacks based on applying the one or more of a plurality of adversarial attack detection operations.

In one aspect, the machine learning component 540 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 6:
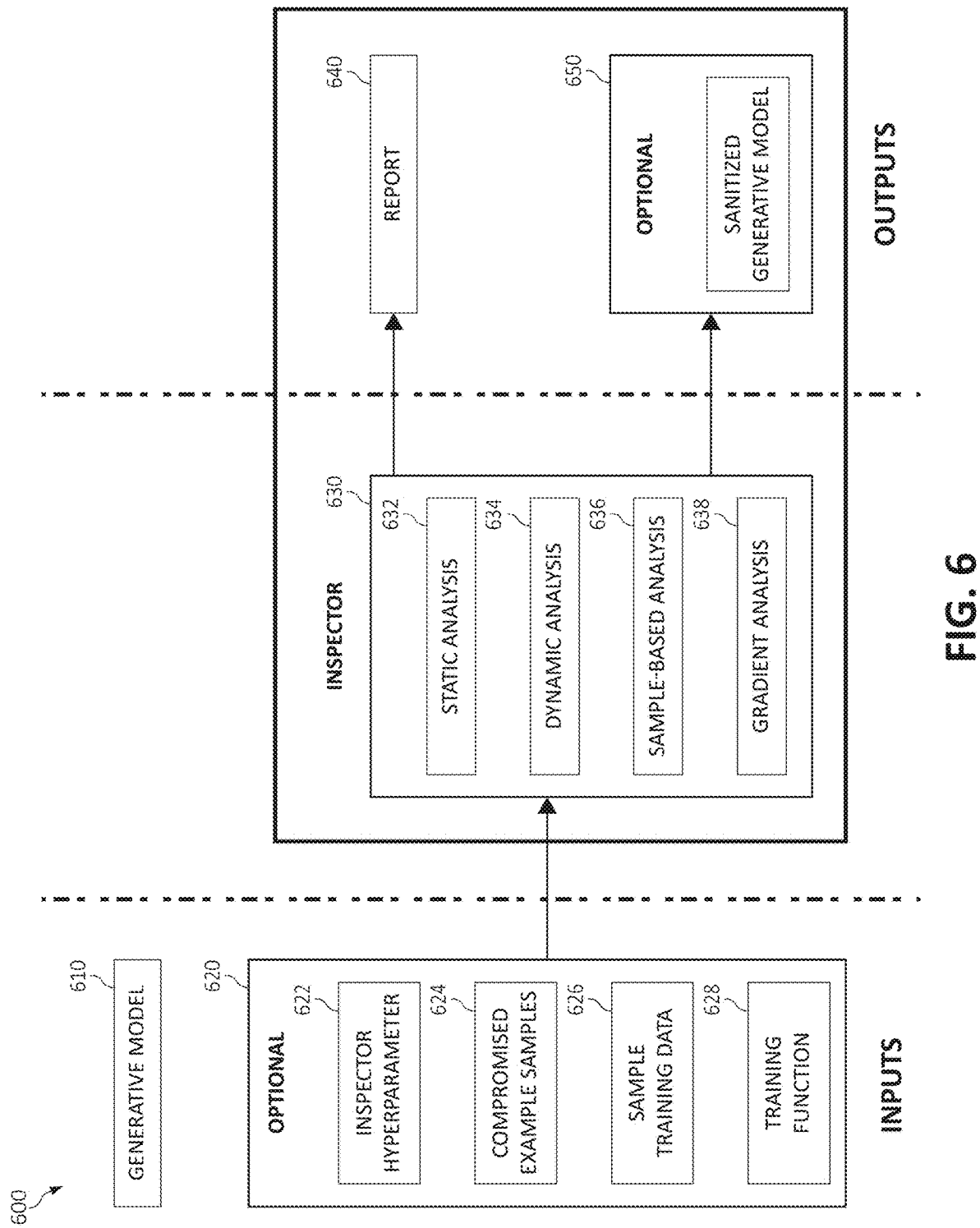
FIG. 6 is an additional block diagram depicting an additional exemplary system for defending deep generative models against adversarial attacks according to an embodiment of the present invention.

For further explanation, FIG. 6 is an additional block diagram depicting an additional exemplary system 600 for defending deep generative models against adversarial attacks according to an embodiment of the present invention. In one aspect, one or more of the components, modules, services, applications, and/or functions described in FIGS. 1-5 may be used in FIG. 6. As will be seen, many of the functional blocks may also be considered "modules" or "components" of functionality, in the same descriptive sense as has been previously described in FIGS. 1-5. Repetitive description of like elements employed in other embodiments described herein is omitted for sake of brevity.

In some embodiments, one or more inputs 610 and/or 620 may be provided to an inspector 630 (e.g., the inspector component 550 of FIG. 5). The inputs 620 may include inspector hyperparameters 622, one or more compromised example samples 624, sample training data 626, and training functions 628. In some embodiments, each of the inputs 610 and/or 620 may be necessary for the inspector 630 to apply one or more adversarial attack detection operations on one or more deep generative models. In some embodiments, the inputs 610 and/or 620 may be selectively used as inputs for the inspector 630 to apply one or more adversarial attack detection operations on one or more deep generative models such as, for example, generative model 610. That is, one or more of the inputs 610 and/or 620 may be required as inputs or they each may be optional as inputs.

The inspector 630, upon receiving the inputs 610 and/or 620 may also access, retrieve, and/or use generative model 610 for applying one or more adversarial attack detection operations on one or more deep generative models such as, for example, generative model 610. In some embodiments, the adversarial attack detection operations may include, for example, a static analysis 632, a dynamic analysis 634, a sample-based analysis 636, and a gradient analysis 638. The inspector 630 may apply the static analysis 632, the dynamic analysis 634, the sample-based analysis 636, the gradient analysis 638, or a combination thereof using the inputs 610 and/or 620 on the generative model 610.

In some embodiments, the inspector 630 may generate a report 640 and a sanitized generative model 650, which may be optionally generated. In some embodiments, the inspector 630 may detect an adversarial attack on the one or more deep generative models based on applying the static analysis 632, the dynamic analysis 634, the sample-based analysis 636, the gradient analysis 638, or a combination thereof using the inputs 610 and/or 620 on the generative model 610. In some embodiments, the inspector 630 may sanitize the generative model 610 based on the detected adversarial attack.

To further illustrate the adversarial attack detection operations, consider the following. In some embodiments, the static analysis 632 may include 1) an architecture size static analysis, which estimates whether the generative model's capacity size indicates the likelihood of a side-arm attack being used on the generative model, 2) a model topology static analysis, which detects any disjoint/parallel compute paths in the compute graph of the generative model, thus indicating a likely side-arm attack, and 3) a model parameter analysis, upon the detection of block-sparse weight matrices, indicates a likely side-arm or weighted sum attack.

That is, the static analysis 632 (e.g., a static model analysis) may include an inspection of the generative model's 610 compute graph and weights. The static analysis may inspect and detect an excessive model capacity of the generative model 610 (e.g., number of neurons in dense layers; number of channels in convolutional layers) that can indicate a side-arm attack or may have been required to embed the harmful mode with high fidelity while yielding normal behavior on genuine input samples (e.g., inputs 610 and/or 620). Disjointed/parallel compute paths in the generative model's 610 compute graph, detected by the static analysis 632, can indicate a weighted-sum or side-arm attack. Block-sparse weight matrices, detected by the static analysis 632, can also indicate weighted-sum or side-arm attacks. Additionally, excessive bias values can arise from $z_{attacker}$ outlier values.

In some embodiments, the dynamic analysis 634 may include 1) an inactive neuron analysis which, given a set of random seeds, identifies whether inactive neural network nodes are triggered only when a random attacker seed is given to the generative model, 2) a gradient masking analysis, which given the detection of shattered or vanishing/ exploding gradients in the generative model, indicates a likelihood of an attack, 3) a sensitivity/redundancy detection analysis, which upon such detection indicates a likely attack has occurred upon the generative model, and 4) an intermediate representation analysis, which identifies any compromised intermediate representations at different nodes within the generative model's network.

Thus, the dynamic analysis 634 may analyze and inspect inactive neurons. The inactive Neurons, under random input samples, may be triggered only via $z_{attacker}$ and thus indicate the presence of a backdoor attack. In some embodiments, the dynamic analysis 634 may analyze and inspect gradient masking. Shattered, vanishing or exploding gradients may have been introduced by an attacker to defeat gradient-based analysis and can be detected via the dynamic analysis 634. In some embodiments, the dynamic analysis 634 may analyze and inspect applying a sensitivity and redundancy analysis of model parameters for some obvious anomalies such as, for example, by perturbing model weights by small amounts to determine if the behavior of the generative model 610 changes (e.g., detecting a drastic or abnormal change). In some embodiments, the dynamic analysis 634 may analyze and inspect intermediate representations that includes analysis of intermediate representations of generative models (e.g., the generative model 610) for different inputs such as, for example, inputs 610 and/or 620. As opposed to neuron analysis for the generative model 610, the intermediate representations analysis refers to analysis of the representations for data.

Figure 7:
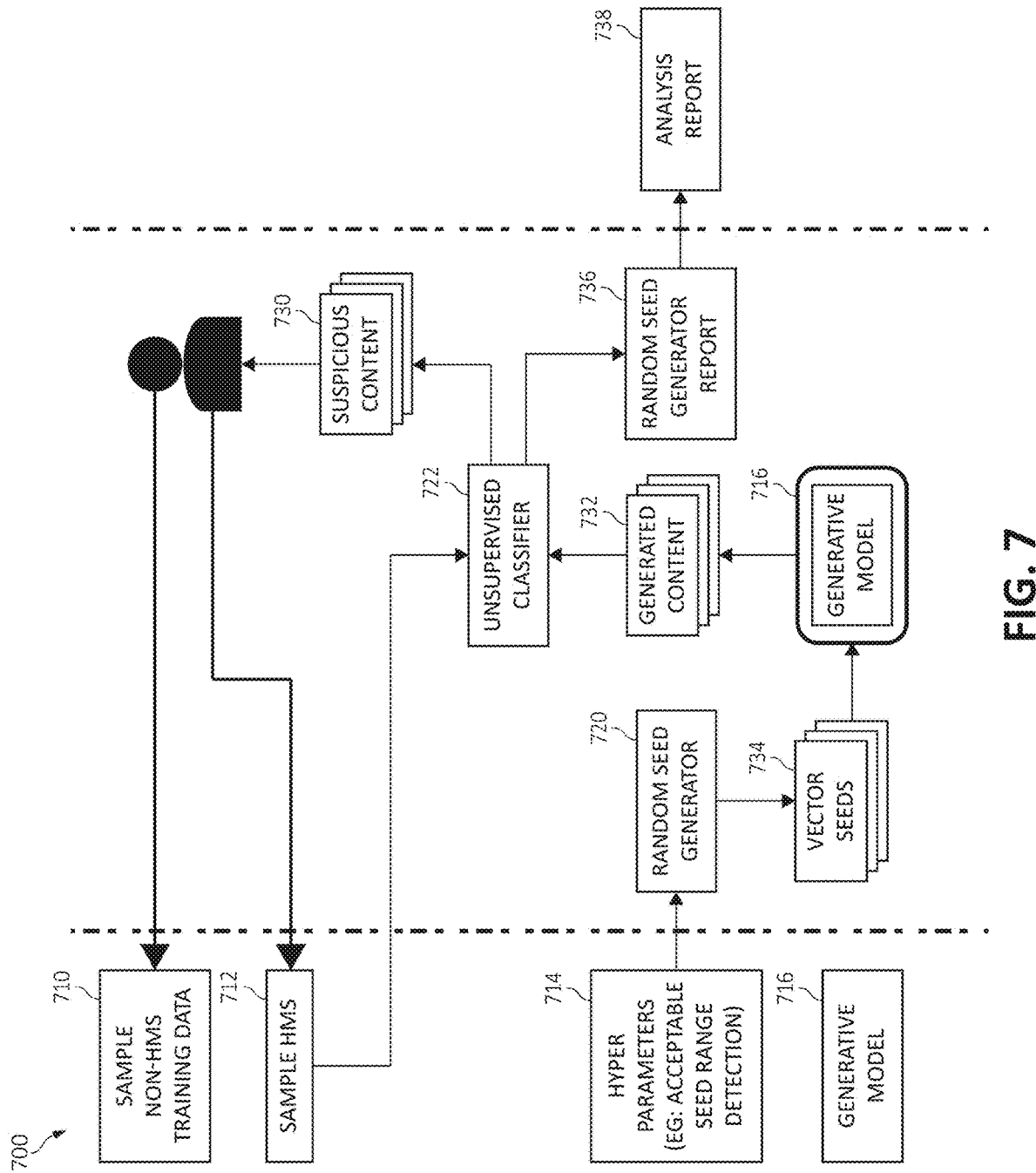
FIG. 7 is an additional block flow diagram depicting operations for defending deep generative models against adversarial attacks according to an embodiment of the present invention.

For further explanation, FIG. 7 is an additional block flow diagram 700 depicting operations for defending deep generative models against adversarial attacks using sample-based analysis according to an embodiment of the present invention.

In sample-based analysis, a brute force sampling generation operation is used to generate samples from randomly generated seeds and determine whether any of these samples are compromised. In some embodiments, the sample-based analysis (e.g., the sample-based analysis 636), the sample-based analysis (e.g., defenders) may use a brute-force search by feeding a large number (e.g., billions) of different inputs into the generator and inspecting the obtained outputs for suspicious outliers/anomalies. This is a particularly effective defense against the data poisoning attack strategy. To further illustrate, consider the following case scenarios. In case 1, a defender is aware and know in advance a type of harmful mode to expect. One or more metrics (e.g., Euclidean distance) can be used to detect generated outputs that resemble the sample-based analysis. In case 2, a defender is unaware and does not know in advance what type of harmful mode to expect. Metrics can be used to measure deviances of generated outputs from expected behavior (e.g., based on the training data). One or more unsupervised operations can be used to inspect the outputs generated with respect to a holdout set and detect any outliers. A machine learning operation and/or system administrator may be used to confirm the presence of an anomaly. The machine learning models may be used to classify generated outputs as harmful as compared to nonharmful content (e.g., detection of offensive content, sensitive data/speech etc.).

For example, using the sample-based analysis 636 component of the inspector 630, the static analysis 632 (e.g., a static model analysis) may include inspecting input data such as, for example, a generative model 716 and one or more hyperparameters 714 (e.g., acceptable seed range detections) provided to a generator such as, for example, the random seed generator 720. The random seed generator 720 may use a brute force sampling generation operation to generate samples from randomly generated seeds such as, for example, vector seeds 734, which are supplied to the generative model 716 to determine whether any of these samples are compromised. In some embodiments, the sample-based analysis (e.g., the sample-based analysis 636), the sample-based analysis (e.g., defenders) may use a brute-force search by feeding a large number (e.g., billions) of different inputs such as, for example, the hyperparameters into the generator and inspecting the obtained outputs for suspicious outliers/anomalies. Metrics can be used to measure deviances of generated outputs (e.g., the generated content 732) from expected behavior (e.g., based on the training data) of the generative model. An unsupervised classifier 722 can be used to inspect the generated content 732 generated from the generative model 724 with respect to a holdout set and detect any outliers. A machine learning operation and/or system administrator may be used to confirm the presence of an anomaly such as, for example, the suspicious content 730. The machine learning models may be used to classify generated outputs as harmful as compared to nonharmful content 710 (e.g., detection of offensive content, sensitive data/speech etc.). The machine learning operation and/or system administrator may use the collected data as feedback as subsequent sample non-harmful mode ("HM") training data 710. This sample non-harmful mode training data 710 and sample harmful mode data 712 may be used by the unsupervised classifier.

The sample-based analysis 636 may provide, as output, a random seed generation report 736 and analysis report 738 indicating one or more potential adversarial attacks and one or more components of the one or more deep generative models susceptible to the one or more potential adversarial attacks based on applying the one or more of a plurality of adversarial attack detection operations.

Figure 8:
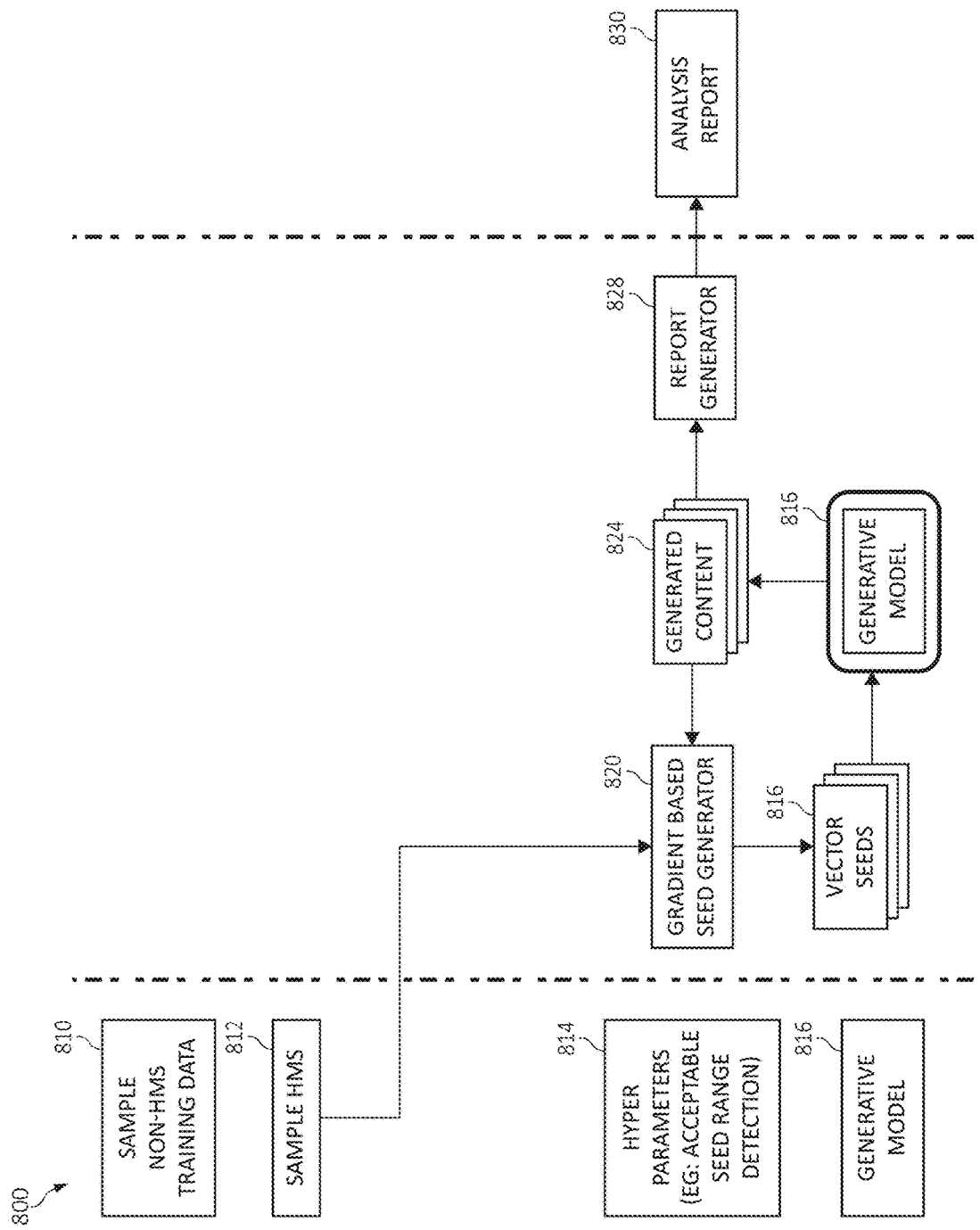
FIG. 8 is an additional block flow diagram depicting operations for defending deep generative models against adversarial attacks according to an embodiment of the present invention.

For further explanation, FIG. 8 is an additional block flow diagram 800 depicting operations for defending deep generative models against adversarial attacks using gradient analysis according to an embodiment of the present invention.

In one aspect, the gradient analysis, which given a known possible compromised sample, uses a gradient descent approach to discover a model seed leading to generated content similar to a compromised data sample. The gradient descent can be used to discover and detect generator inputs (e.g., the inputs to the random seed generator) that yield generated content (e.g., generated output) resembling (e.g., in Euclidean norm) specific harmful mode examples (if available). The gradient descent may also be used to discover and detect generator inputs that yield outputs deviating (e.g., in Euclidean norm, with respect to feature-space metrics or with respect to model explanations like saliency map, LIME etc. from genuine data manifold samples (if available). When resorting to gradient based analysis, the defender ought to also perform static and dynamic analysis in order to mitigate any gradient masking potentially introduced by the attacker.

For example, using the gradient analysis 638 of the inspector 630, the gradient analysis 636 may include inspecting input data such as, for example, a generative model 812 and one or more hyperparameters 814 (e.g., acceptable seed range detections) provided to a generator such as, for example, the gradient based seed generator 820. The generator (e.g., a gradient based seed generator 820) may use sample non-harmful mode ("HM") training data 810 and sample harmful mode data 812, which is received as input. The generator (e.g., a gradient based seed generator 820) may use a gradient descent to generate samples from randomly generated seeds such as, for example, vector seeds 734, which are supplied to the generative model 816 to determine whether any of these samples are compromised. The gradient analysis 636 uses a gradient descent approach to discover a model seed (e.g., the vector seeds) leading to generated content similar to a compromised sample. Instead of brute-force random sampling search, gradient descent can be used to discover and detect generator inputs that yield outputs (e.g., generated content 824) resembling (e.g., in Euclidean norm) specific harmful mode examples (if available). The gradient descent may also be used to discover and detect generator inputs (e.g., the hyperparameters 814) that yield outputs (e.g., generated content 824 from the generative models 816) deviating (e.g., in Euclidean norm, with respect to feature-space metrics or with respect to model explanations like saliency map, LIME etc.) from genuine data manifold samples (if available). When resorting to gradient analysis 638, static analysis 632 and dynamic analysis 634 may also be employed in order to mitigate any gradient masking potentially introduced by the attacker.

The analysis may provide, as output using a report generator 828 and an analysis report 830 indicating one or more potential adversarial attacks and one or more components of the one or more deep generative models 816 susceptible to the one or more potential adversarial attacks based on applying the one or more of a plurality of adversarial attack detection operations.

Figure 9:
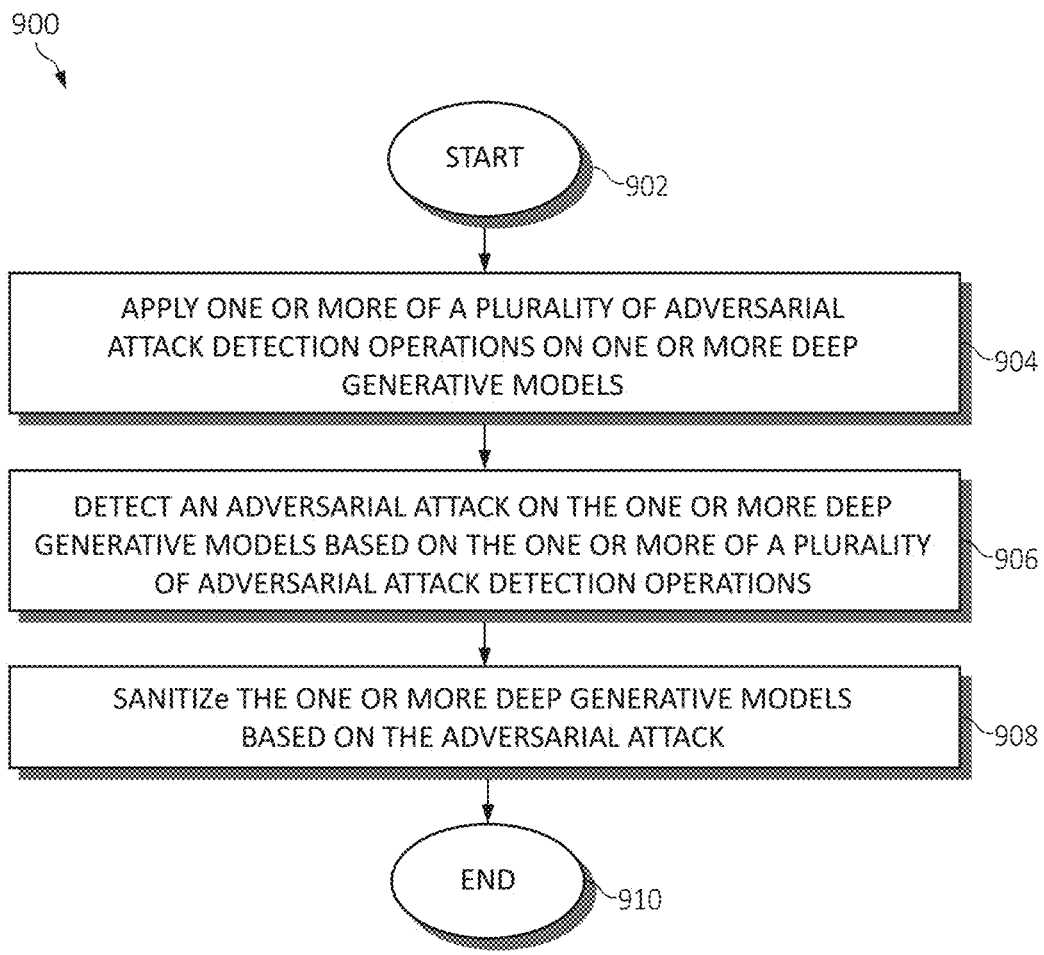
FIG. 9 is a flowchart diagram depicting an exemplary method for defending deep generative models against adversarial attacks in a computing environment, by a processor, in which aspects of the present invention may be realized.

Turning now to FIG. 9, a method 500 for defending deep generative models against adversarial attacks in a computing environment using a processor is depicted, in which various aspects of the illustrated embodiments may be implemented. The functionality 900 may be implemented as a method (e.g., a computer-implemented method) executed as instructions on a machine, where the instructions are included on at least one computer readable medium or one non-transitory machine-readable storage medium. The functionality 900 may start in block 502.

One or more of a plurality of adversarial attack detection operations may be applied on one or more deep generative models, as in block 904. An adversarial attack on the one or more deep generative models may be detected based on the one or more of a plurality of adversarial attack detection operations, as in block 906. The one or more deep generative models may be sanitized based on the adversarial attack, as in block 908. The functionality 900 may end, as in block 901.

In one aspect, in conjunction with and/or as part of at least one blocks of FIG. 9, the operations of method 900 may include each of the following. The operations of 900 may provide compromised data to the one or more deep generative models for testing the one or more of a plurality of adversarial attack detection operations. The operations of 900 may provide training data to the one or more deep generative models for testing the one or more of a plurality of adversarial attack detection operations. The operations of 900 may apply a static analysis or dynamic analysis on one or more deep generative models, wherein the plurality of adversarial attack detection operations include the static analysis and the dynamic analysis.

The operations of 900 may apply a sample-based analysis on one or more deep generative models, where the dynamic analysis is one of the plurality of adversarial attack detection operations. The operations of 900 may apply a gradient analysis on one or more deep generative models, where the dynamic analysis is one of the plurality of adversarial attack detection operations. The operations of 900 may indicate one or more potential adversarial attacks and one or more components of the one or more deep generative models susceptible to the one or more potential adversarial attacks based on applying the one or more of a plurality of adversarial attack detection operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for defending deep generative models from adversarial attacks in a computing environment by one or more processors comprising:
    applying one or more of a plurality of adversarial attack detection operations on one or more deep generative models, including a static analysis with inspection of the compute graph and weights of one or more deep generative models;
    detecting an adversarial attack on a first deep generative model of the one or more deep generative models based on the applied adversarial attack detection operations; and
    generating a sanitized deep generative model from the first deep generative model based on the detected adversarial attack.

2. The method of claim 1, further including providing compromised data to the one or more deep generative models for testing the one or more of a plurality of adversarial attack detection operations.

3. The method of claim 1, further including providing training data to the one or more deep generative models for testing the one or more of a plurality of adversarial attack detection operations.

4. The method of claim 1, further including:
    applying a dynamic analysis on the one or more deep generative models,
    wherein:
    the plurality of adversarial attack detection operations include the dynamic analysis with analysis and inspection of inactive neurons.

5. The method of claim 1, further including:
    applying a sample-based analysis on one or more deep generative models,
    wherein the sample-based analysis is one of the plurality of adversarial attack detection operations.

6. The method of claim 1, further including:
    applying a gradient analysis on one or more deep generative models,
    wherein the gradient analysis is one of the plurality of adversarial attack detection operations.

7. The method of claim 1, further including indicating one or more potential adversarial attacks and one or more components of the one or more deep generative models susceptible to the one or more potential adversarial attacks based on applying the one or more of a plurality of adversarial attack detection operations.

8. The computer-implemented method of claim 1, wherein the detected adversarial attack is a harmful mode poisoning attack.

9. A system for defending deep generative models from adversarial attacks in a computing environment, comprising:
    one or more computers with executable instructions that when executed cause the system to:
    apply one or more of a plurality of adversarial attack detection operations on one or more deep generative models, including a static analysis with inspection of the compute graph and weights of one or more deep generative models;

detect an adversarial attack on a first deep generative model of the one or more deep generative models based on the applied adversarial attack detection operations; and generate a sanitized deep generative model from the first deep generative model based on the detected adversarial attack.

10. The system of claim 9, wherein the executable instructions when executed cause the system to provide compromised data to the one or more deep generative models for testing the one or more of a plurality of adversarial attack detection operations.

11. The system of claim 9, wherein the executable instructions when executed cause the system to provide training data to the one or more deep generative models for testing the one or more of a plurality of adversarial attack detection operations.

12. The system of claim 9, wherein the executable instructions when executed cause the system to apply a dynamic analysis on the one or more deep generative models, wherein the plurality of adversarial attack detection operations include the dynamic analysis with analysis and inspection of inactive neurons.

13. The system of claim 9, wherein the executable instructions when executed cause the system to:
apply a sample-based analysis on one or more deep generative models,
wherein the sample-based analysis is one of the plurality of adversarial attack detection operations.

14. The system of claim 9, wherein the executable instructions when executed cause the system to:
apply a gradient analysis on one or more deep generative models,
wherein the gradient analysis is one of the plurality of adversarial attack detection operations.

15. The system of claim 9, wherein the executable instructions when executed cause the system to indicate one or more potential adversarial attacks and one or more components of the one or more deep generative models susceptible to the one or more potential adversarial attacks based on applying the one or more of a plurality of adversarial attack detection operations.

16. A computer program product for defending deep generative models from adversarial attacks in a computing environment, the computer program product comprising:
one or more computer readable storage media, and program instructions collectively stored on the one or more computer readable storage media, the program instruction comprising:
program instructions to apply one or more of a plurality of adversarial attack detection operations on one or more deep generative models, including a static analysis with inspection of the compute graph and weights of one or more deep generative models;
program instructions to detect an adversarial attack on a first deep generative model of the one or more deep generative models based on the applied adversarial attack detection operations; and
program instructions to generate a sanitized deep generative model from the first deep generative model based on the detected adversarial attack.

17. The computer program product of claim 16, further including program instructions to provide compromised data to the one or more deep generative models for testing the one or more of a plurality of adversarial attack detection operations.

18. The computer program product of claim 16, the program instructions further including:
program instructions to apply a sample-based analysis on one or more deep generative models,
wherein the sample-based analysis is one of the plurality of adversarial attack detection operations.

19. The computer program product of claim 16, the program instructions further including:
program instructions to apply a gradient analysis on one or more deep generative models,
wherein the gradient analysis is one of the plurality of adversarial attack detection operations.

20. The computer program product of claim 16, further including program instructions to indicate one or more potential adversarial attacks and one or more components of the one or more deep generative models susceptible to the one or more potential adversarial attacks based on applying the one or more of a plurality of adversarial attack detection operations.

* * * * *